United States Patent
Johansson

(12) 
(10) Patent No.: US 8,490,741 B2
(45) Date of Patent: Jul. 23, 2013

(54) STRAIGHT MOTION ASSISTING DEVICE FOR A WORK MACHINE

(75) Inventor: Håkan Johansson, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 258 days.

(21) Appl. No.: 12/992,625

(22) PCT Filed: Jun. 18, 2008

(86) PCT No.: PCT/SE2008/000405
§ 371 (c)(1),
(2), (4) Date: Nov. 15, 2010

(87) PCT Pub. No.: WO2009/154519
PCT Pub. Date: Dec. 23, 2009

(65) Prior Publication Data
US 2011/0067944 A1    Mar. 24, 2011

(51) Int. Cl.
*B62D 12/00* (2006.01)
(52) U.S. Cl.
USPC ............................................. 180/418
(58) Field of Classification Search
USPC .......................... 180/418, 419, 420
See application file for complete search history.

(56) References Cited

U.S. PATENT DOCUMENTS

| | | | | |
|---|---|---|---|---|
| 3,096,844 A | * | 7/1963 | Sittel et al. | 180/420 |
| 3,444,948 A | | 5/1969 | Bianchetta et al. | |
| 3,688,860 A | * | 9/1972 | Molby | 180/420 |
| 4,310,061 A | * | 1/1982 | Khanna et al. | 180/420 |
| 4,365,685 A | * | 12/1982 | Ratsko et al. | 180/419 |
| 4,444,409 A | * | 4/1984 | Garrison | 280/492 |
| 4,700,794 A | | 10/1987 | Bernhagen et al. | |

FOREIGN PATENT DOCUMENTS
EP    1894814 A2    3/2008

OTHER PUBLICATIONS

JP11301503 A Kobe Steel Ltd, Nov. 2, 1999 (abstract).
JP54090726 A, Komatsu Ltd., Jul. 18, 1979 (abstract).
International Search Report for corresponding International App. PCT/SE2008/000405.
International Preliminay Report on Patentability for corresponding International App. PCT/SE2008/000405.

* cited by examiner

*Primary Examiner* — Kevin Hurley
(74) *Attorney, Agent, or Firm* — WRB-IP LLP

(57) ABSTRACT

A straight motion assisting device for a work machine is adapted for receiving an input indicative of a steering angle from a position of a moveable member and adapted for applying a restoring force for affecting the work machine towards a straight motion when the steering angle input indicates that the work machine deviates from the straight motion. The device includes a hydraulic system adapted to be effected by the displacement of the moveable member and adapted to apply the restoring force.

12 Claims, 4 Drawing Sheets

STRAIGHT MOTION ASSISTING DEVICE FOR A WORK MACHINE

BACKGROUND AND SUMMARY

The present invention relates to a straight motion assisting device for a work machine, wherein the device is adapted for receiving an input indicative of a steering angle from a position of a moveable member and adapted for applying a restoring force for affecting the work machine towards a straight motion when the steering angle input indicates that the work machine deviates from the straight motion.

The straight motion assisting device is especially adapted for an articulated (or frame-steered) work machine. Such a work machine comprises a front section with a front frame and a first set of ground engaging members, a rear section with a rear frame and a second set of ground engaging members, and at least one pivot joint between the front section and the rear section allowing the front section to pivot with regard to the rear section about an axis extending in a vertical direction of the work machine. Further, the work machine comprises means for steering the work machine via pivoting the front section relative to the rear section about the vertical pivot axis. The steering means is normally formed by a pair of hydraulic cylinders.

The invention will below be described for an articulated hauler. This should however be regarded as a non-limiting example, —wherein the invention may be realized in other types of articulated work machines, such as wheel loaders. Further terms frequently used for work machines are "earthmoving machinery", "off-road work machines", "construction equipment" and "forest machines". The term "ground engaging members" may comprise wheels, caterpillar tracks etc.

In connection with transportation of heavy loads, e.g. in contracting work, a work machine of the type of an articulated hauler is frequently used. Such work machines may be operated with large and heavy loads in areas where there are no roads, for example for transports in connection with road or tunnel building, sand pits, mines, forestry and similar environments. Thus, an articulated hauler is frequently used in rough terrain with various slippery ground.

It is emphasized that a frame-steered work machine is adapted for an optimized off road performance with regard to any vehicle with Ackerman steering (front wheel steering). More specifically, the articulated steering creates conditions for using much larger (both with regard to diameter and width) front wheels than with so-called Ackermann steering.

The geometry of a conventional articulated work machine can make the steering unstable. If the machine is steered out from centre (i.e. a straight forward direction) the driver normally needs to apply a force on the steering wheel in order to get the machine back into straight forward direction.

JP 54-90726 discloses a frame-steered work machine provided with a straight motion assisting device. A motor is directly connected to a steering wheel shaft in order to apply a restoring force on the shaft. A servoamplifier is adapted to control rotation of the motor. A steering angle and a vehicle speed are detected. The motor is controlled to apply the restoring force on the steering wheel shaft when the steering angle deviates from a position indicative of a straight work machine motion and the vehicle speed is above a predetermined limit.

The steering is a function that is critical with regard to safety. There are therefore high quality demands on the computer and associated electronics for the steering function.

It is desirable to achieve a straight motion assisting device for a work machine, which is reliable and cost-efficient.

According to an aspect of the present invention, a work machine includes a straight motion assisting device defined in the introduction above, characterized in that the device comprises a hydraulic system adapted to be effected by the displacement of the moveable member and adapted to apply the restoring force.

One advantage of using a hydraulic system is that the straight motion function can be achieved by means of well known and cost-efficient components.

Thus, the work machine is urged towards a state representing a straight forward (or rearward) direction during the restoring procedure when the steering angle input indicates that the work machine is steered out of said straight forward direction. This is advantageously achieved by controlling the same actuators (normally hydraulic cylinders), which are arranged for performing the steering function.

The position of the moveable member is preferably directly mechanically associated to a steering position of the work machine.

According to a preferred embodiment, the hydraulic system is adapted to apply the restoring force on a member adapted to transmit a motion in a steering apparatus for steering the work machine. This embodiment creates further conditions for a reliable solution with a long life. More specifically, the restoring force is applied on a mechanical link adapted to transmit a steering motion from a steering wheel to the hydraulic steering cylinders. Thus, the steering apparatus is adapted for a mechanical-hydraulic steering.

According to a further development of the embodiment above, the motion transmitting member is formed by the moveable member. Thus, the element that provides the steering angle information is the same as the element that is affected with the restoring force. This embodiment creates conditions for a solution with relatively few parts for achieving the straight motion restoration.

According to a further preferred embodiment, the hydraulic system comprises a hydraulic cylinder with a piston adapted for a reciprocating motion in the cylinder, and that the piston is connected to the moveable member for movement in the cylinder in response to displacement of the moveable member. This embodiment creates conditions for a solution with well known components for achieving the straight motion restoration.

According to a further development of the last mentioned embodiment, the piston defines a first cylinder interior space on a first side of the piston and a second cylinder interior space on a second side of the piston, that the hydraulic system comprises a first hydraulic circuit adapted for flow communication via the first cylinder space and a second hydraulic circuit adapted for flow communication via the second cylinder space when the piston is in a neutral position and that the piston is adapted to close one of said circuits when it is moved a predefined distance from the neutral position. In this way, the interior space which is associated to the closed circuit may be pressurized for pushing the piston back to the neutral position for achieving the straight motion restoration.

According to a further development of the last mentioned embodiment, the hydraulic system comprises a first pump and a second pump, that the first pump is operatively connected to the hydraulic cylinder via said first circuit and the second pump is operatively connected to the hydraulic cylinder via said second-circuit, wherein each pump is adapted to pressurize its associated cylinder interior space when its associated circuit is closed.

According to a further development of the last mentioned embodiment, the pump is rotationally connected to a rotational member, which is adapted to rotate in response to work machine motion. In this way, the pumps are only operated (rotated) when the work machine is in motion. Thus, no restoring force will be applied when the work machine is standing still.

Further preferred embodiment and advantages thereof emerge from the description below, the figures and the claims.

BRIEF DESCRIPTION OF FIGURES

The invention will be described in greater detail below with reference to the embodiments shown in the accompanying drawings, in which.

DETAILED DESCRIPTION

Figure 1:
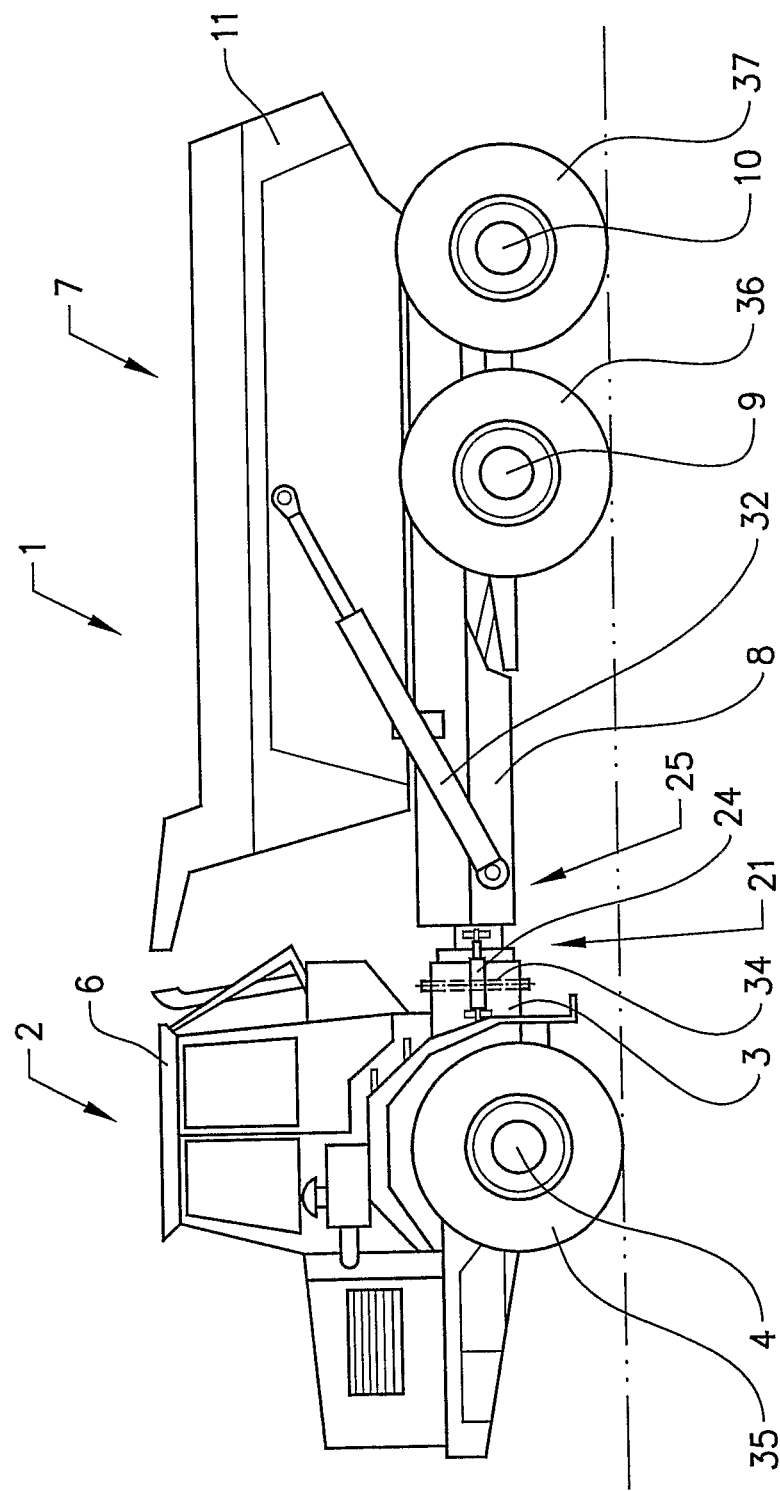
FIG. 1 shows an articulated hauler in a side view.

FIG. 1 shows an articulated hauler (also called frame-steered dumper) 1 in a side view. The articulated hauler comprises a front vehicle section 2 comprising a front frame 3, a front wheel axle 4 and a cab 6 for a driver. The articulated hauler 1 also comprises a rear vehicle section 7 comprising a rear frame 8, a front wheel axle 9, a rear wheel axle 10 and a tiltable container 11.

Figure 2:
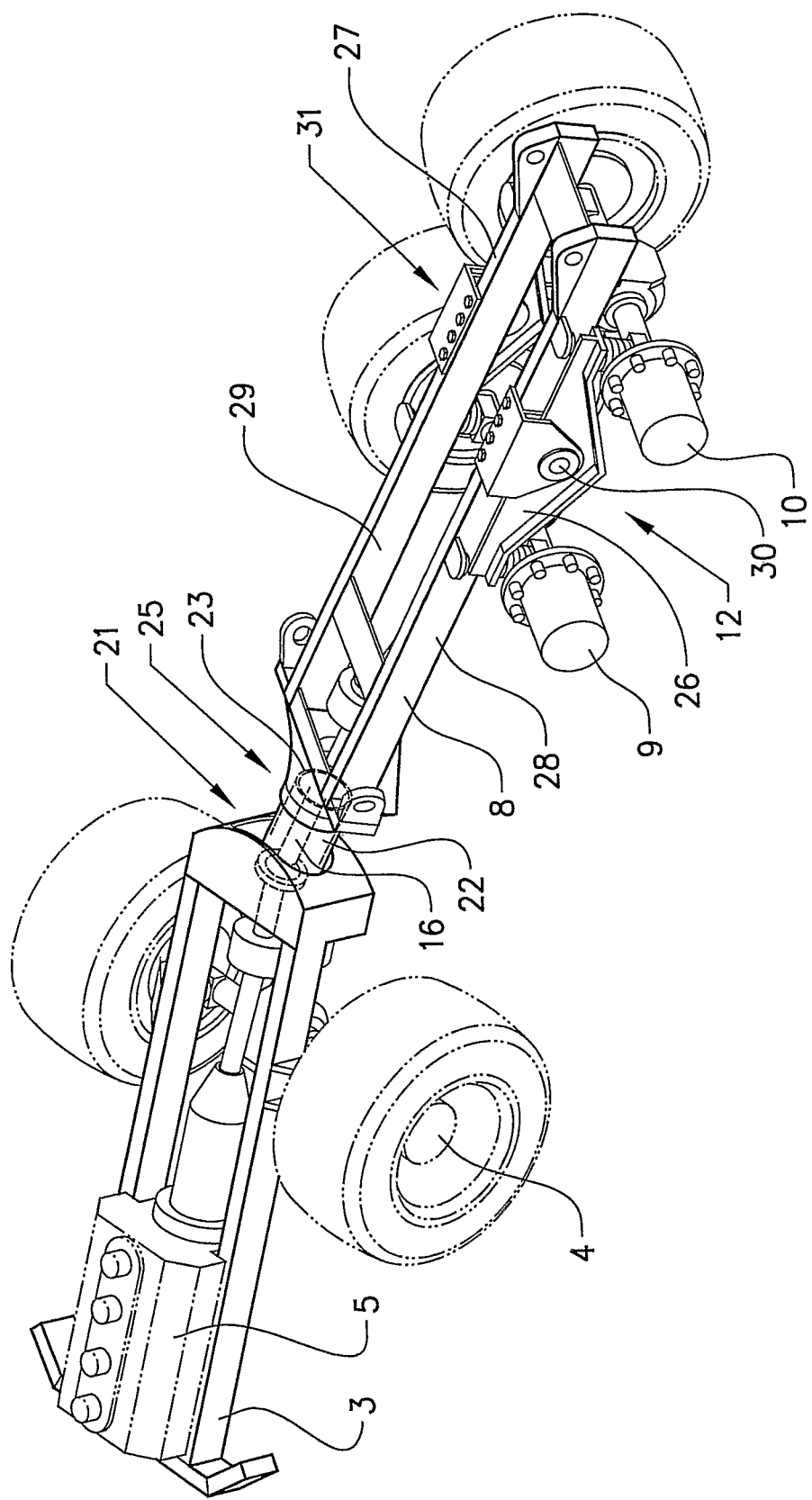
FIG. 2 shows a front frame and a rear frame in the articulated hauler.

The front and rear wheel axles 9,10 of the rear vehicle section 7 are connected to the rear frame 8 via a bogie arrangement 12, see FIG. 2. Each of the axles comprises a left ground engagement element 35,36,37 and a right ground engagement element (not shown) in the form of wheels.

A first pivot joint 25 is adapted in order to allow the front frame 3 and the rear frame 8 to be pivoted relative to one another about an imaginary longitudinal axis, that is to say an axis which extends in the longitudinal direction of the vehicle 1.

The front frame 3 is connected to the rear frame 8 via a second joint 21 which allows the front frame 3 and the rear frame 8 to be rotated relative to one another about a vertical axis 34 for steering (turning) the vehicle. Actuators in the form of a pair of hydraulic cylinders 24 are arranged on respective sides of the rotary joint 21 for steering the vehicle. The hydraulic cylinders are controlled by the driver of the vehicle via a wheel and/or a joystick (not shown).

The container 11 is connected to the rear frame 8 via an articulation (not shown), see FIG. 2, at a rear portion of the rear frame 8. A pair of tilting cylinders 32 are connected to the rear frame 8 with a first end and connected to the platform body 11 with a second end. The tilting cylinders 32 are positioned one on each side of the central axis of the vehicle in its longitudinal direction. The platform body 11 is therefore tilted in relation to the rear frame 8 on activation of the tilting cylinders 32.

FIG. 2 shows the front frame 3 and the rear frame 8 more in detail in a perspective view. A power source in the form of an internal combustion engine (a diesel engine) 5 is rigidly connected to the front frame 3 and adapted for propelling the hauler 1. The first pivot joint 25 comprises two tubular or circular cylindrical parts 22,23 of complementary shape relative to one another. The first tubular part 22 is anchored to the front frame 3, and the second tubular part 23 is anchored to the rear frame 8. The first tubular part 22 is received slidably in the second tubular part 23 so that the front frame 3 can be pivoted in relation to the rear frame 8 about said imaginary longitudinal axis.

In FIG. 2, the front frame 3 is in a position displaced about the first pivot joint 25 relative to the rear frame 8. Furthermore, the front frame 3 is in a position displaced about the second pivot joint 21 relative to the rear frame 8.

The bogie axles 9,10 are mounted in the rear frame 8 via a right and left bogie element 26,27, which elements extend essentially in the longitudinal direction of the vehicle. The bogie elements 26, 27 are rigid, in the form of beams. Each of the bogie elements 26,27 is arranged along an adjacent longitudinal frame beam 28,29 in the rear frame 8 and is mounted rotatably therein via a rotary joint 30,31. The bogie arrangement 12 allows a relative diagonal movement between the bogie elements 26,27 and thus a state in which the bogie elements are positioned with different inclination in relation to a horizontal plane.

Figure 3:
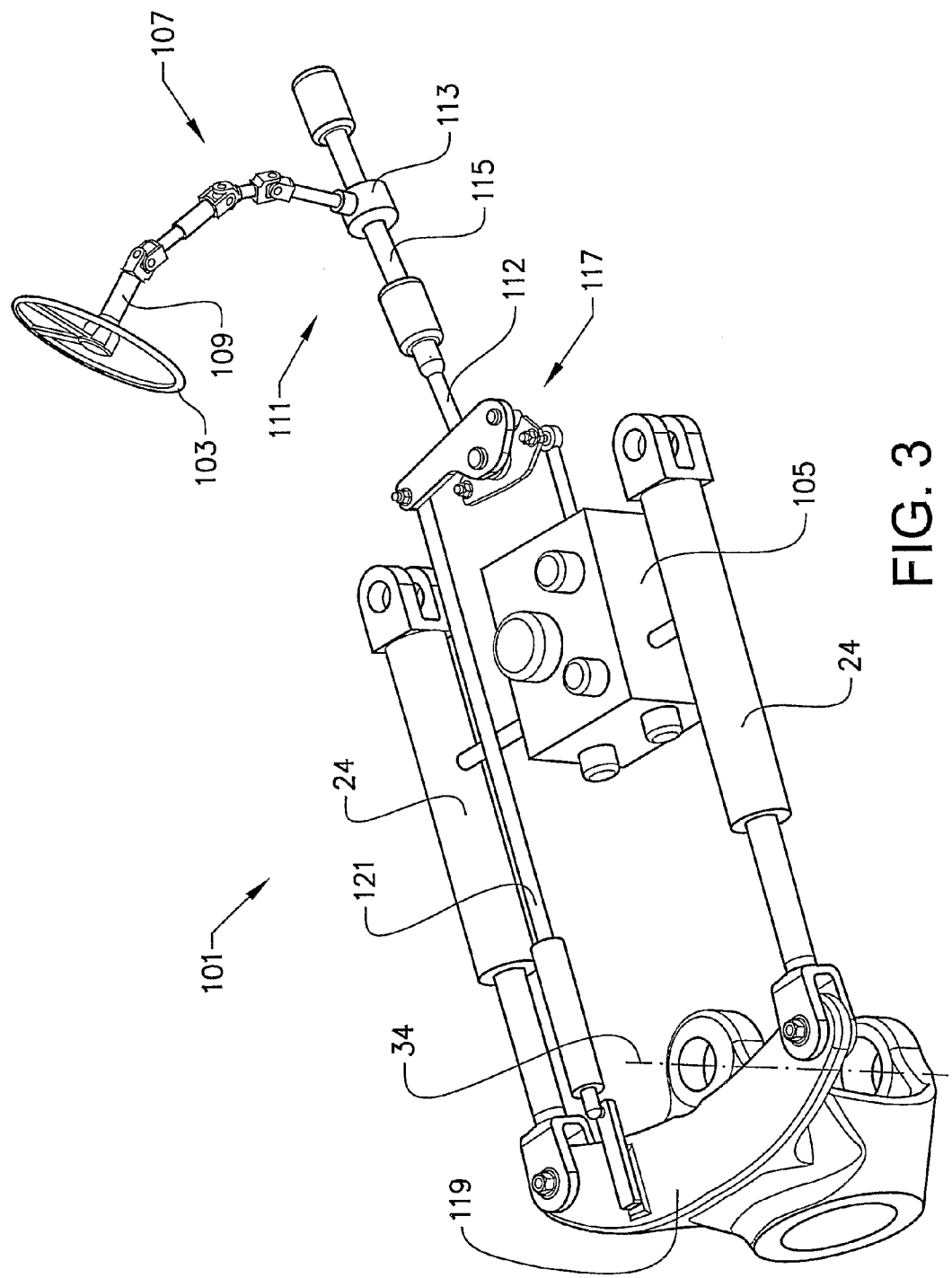
FIG. 3 shows a steering apparatus for steering the articulated hauler.

FIG. 3 shows a steering apparatus 101 for steering the articulated hauler 1. An operator controlled element 103 in the form of a steering wheel is adapted to control a valve unit 105 via a link arm system 107. The valve unit 105 is adapted to control a flow communication from a pump (not shown) to the hydraulic steering cylinders 24. More specifically, the steering wheel 103 is arranged on a steering column 109, which is adapted to control a steering gear 111. The steering gear 111 is adapted to convert a rotational movement from the steering wheel 103 to a linear movement of a moveable member 112. The moveable member 112 is adapted to be displaceable along a straight line. The moveable member 112 is connected to the steering wheel 103 for a simultaneous movement therewith.

More specifically, the steering gear 111 comprises a gear wheel 113, which is in engagement with a rack 115, wherein a rotational movement of the gear wheel 113 displaces the rack in its longitudinal direction. The rack 115 is connected to the valve unit 105 via a link arm arrangement 117 for opening a flow communication to the steering cylinders 24 when the steering wheel 103 is turned. The rack 115 and the moveable member 112 are connected in such a manner that a linear motion of the rack results in a corresponding linear motion of the moveable member. The moveable member 112 may be integrated in the rack 115.

The steering cylinders 24 are pivotably connected at either side of a transverse frame member 119 of the rear frame 8 for steering the machine. A rod 121 is connected between the transverse frame member 119 and the link arm arrangement 117 for closing a flow communication to the steering cylinders 24 when the steering angle corresponds to the turning of the steering wheel 103. Thus, there is a mechanical steering angle feed back. Hence, a specific rotational position of the steering wheel 103 corresponds to a specific steering angle.

Figure 4:
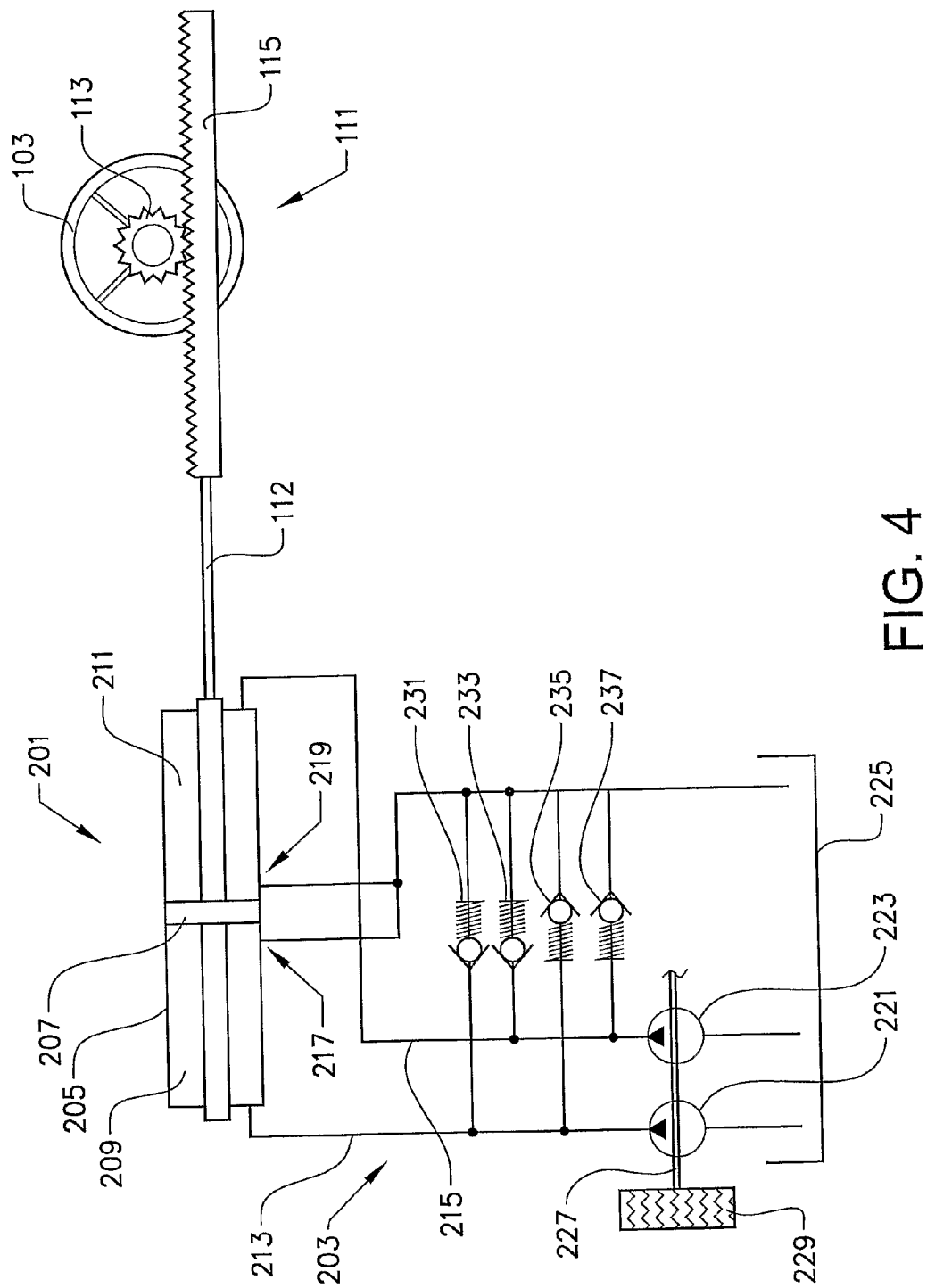
FIG. 4 schematically shows a straight motion assisting device according to a first embodiment of the present invention.

FIG. 4 shows a schematic illustration of a straight motion assisting device 201 for the steering apparatus 101. The device 201 is adapted for receiving an input indicative of a steering angle from a position of the moveable member 112 and adapted for applying a restoring force for affecting the work machine towards a straight motion when the steering angle input indicates that the work machine deviates from the straight motion. More specifically, the device 201 comprises a hydraulic system 203 adapted to be effected by the displacement of the moveable member 112 and adapted to apply the restoring force.

The hydraulic system 203 is adapted to apply the restoring force on a member 112 adapted to transmit a motion in the steering apparatus for steering the work machine. The motion transmitting member 112 is formed by said moveable member.

The hydraulic system 203 comprises a hydraulic cylinder 205 with a piston 207 adapted for a reciprocating motion in the cylinder. The piston 207 is connected to the moveable member 112 for movement in the cylinder in response to displacement of the moveable member. The piston 207 defines a first cylinder interior space 209 on a first side of the piston and a second cylinder interior space 211 on a second side of the piston.

The hydraulic system 203 comprises a first hydraulic circuit 213 adapted for flow communication via the first cylinder space 209 and a second hydraulic circuit 215 adapted for flow communication via the second cylinder space 211 when the piston is in a neutral position. The piston 207 is adapted to close one of said circuits 213,215 when it is moved a predefined distance from the neutral position. More specifically, the hydraulic cylinder 205 comprises a first opening 217 and a second opening 219, one on each side of a neutral position of the piston 207. The piston 207 is adapted to close one of said openings 217,219 when it is moved said predefined distance from the neutral position.

The hydraulic system 203 comprises at least one pump 221,223 which is operatively connected to the hydraulic cylinder 205 for moving the piston 207 by pressurizing an interior space of the hydraulic cylinder. More specifically, said at least one pump 221,223 is operatively connected to said circuits 213,215 and adapted to pressurize the interior space of the hydraulic cylinder which is associated to the closed circuit. According to the shown embodiment, the hydraulic system 203 comprises a first pump 221 and a second pump 223. The first pump 221 is operatively connected to the hydraulic cylinder via said first circuit 213 and the second pump 223 is operatively connected to the hydraulic cylinder via said second circuit 215. Thus, each pump 221,223 is adapted to pressurize its associated cylinder interior space when its associated circuit is closed. More specifically, each of the first and second circuit 213,215 is adapted for a flow communication between the associated pump 221,223 and a tank 225 via its associated interior space when the piston is in the neutral position. A communication to the tank 225 via one of said circuits is closed by the piston 207 when it is moved said predefined distance from the neutral position.

In other words, the flow from one of the pumps will create a pressure that will push the piston 207 towards the neutral position. Since the steering gear 111' is mechanically connected to the steering wheel 103, the steering wheel will simultaneously be pushed towards its centre position (corresponding to the straight motion of the machine).

The hydraulic system 203 further comprises a first and second relief valve 231, 233 connected to each of the first and second circuits 213,215 on a line bypassing the cylinder 205. By virtue of the relief valves, a centering force will be limited.

The hydraulic system 203 further comprises a first and second check valve 235, 237 connected to each of the first and second circuits 213,215 on a line connecting an outlet port of the cylinder 205 and the tank 225. In situations where the pumps supply less oil than is needed for the centering motion, the check valves 235,237 allow oil fill up the cylinder.

Said at least one pump 221,223 is adapted to be operated in response to that the work machine is in motion. The pumps 221,223 are therefore rotationally connected to a rotational member 227, which is adapted to rotate in response to work machine motion. A ground engaging member 229 in the form of a wheel is illustrated in FIG. 4, wherein the rotational member 227 is adapted to rotate when the wheel rotates and be still when the wheel is still. This ensures that the centering function will not be activated when the machine is standing still.

The invention is not to be regarded as being limited to the illustrative embodiments described above, but a number of further variants and modifications are conceivable within the scope of the patent claims below.

The invention claimed is:

1. A straight motion assisting device for a work machine, wherein the device receives an input indicative of a steering angle from a position of a moveable member and applies a restoring force for affecting the work machine towards a straight motion when the steering angle input indicates that the work machine deviates from the straight motion, wherein the device comprises
a hydraulic system that is effected by displacement of the moveable member and that applies the restoring force, the hydraulic system comprising a hydraulic cylinder with a piston that is reciprocable in the cylinder, the piston being connected to the moveable member for movement in the cylinder in response to displacement of the moveable member, the hydraulic system comprising at least one pump which is operatively connected to the hydraulic cylinder for moving the piston by pressurizing an interior space of the hydraulic cylinder, wherein the at least one pump is arranged to be operated in response to the work machine being in motion.

2. A straight motion assisting device according to claim 1, wherein the hydraulic system is arranged to apply the restoring force on a motion transmitting member arranged to transmit a motion in a steering apparatus for steering the work machine.

3. A straight motion assisting device according to claim 2, wherein the motion transmitting member is formed by the moveable member.

4. A straight motion assisting device according to claim 1, wherein the piston defines a first cylinder interior space on a first side of the piston and a second cylinder interior space on a second side of the piston, that the hydraulic system comprises a first hydraulic circuit arranged for flow communication is the first cylinder space and a second hydraulic circuit arranged for flow communication via the second cylinder space when the piston is in a neutral position and that the piston is arranged to close one of the circuits when it is moved a predefined distance from the neutral position.

5. A straight motion assisting device according to claim 4, wherein the at least one pump is operatively connected to the circuits and arranged to pressurize the interior space of the hydraulic cylinder which is associated a closed one of the circuits.

6. A straight motion assisting device according to claim 4, wherein the hydraulic system comprises a first pump and a second pump, the first pump being, operatively connected to the hydraulic cylinder via the first circuit and the second pump being operatively connected to the hydraulic cylinder via the second circuit, wherein each pump is arranged to pressurize its associated cylinder interior space when its associated circuit is closed.

7. A straight motion assisting device according to claim 5, wherein each of the first and second circuit is arranged for a flow communication between the at least one pump and a tank via its associated interior space in the cylinder when the piston is in the neutral position and that a communication to the tank via one of the circuits is closed by the piston when it is moved the predefined distance from the neutral position.

8. A straight motion assisting device according to claim 1, wherein the pump is rotationally connected to a rotational member which rotates in response to work machine motion.

9. A straight motion assisting device according to claim 1, wherein the moveable member is displaceable along a straight line.

10. A straight motion assisting device according to claim 1, wherein the moveable member is connected to an operator controlled element for a simultaneous movement therewith.

11. A straight motion assisting device according to claim 10, wherein the operator controlled element is constituted by a steering wheel.

12. An articulated work machine comprising a front section with a front frame and a first set of around engaging members, a rear section with a rear frame and a second set of ground engaging members, a pivot joint between the from section and the rear section allowing the front section to pivot with regard to the rear section about an axis extending in a vertical direction of the work machine and means for steering the work machine via pivoting the front section relative to the rear section about the vertical pivot axis, wherein the work machine comprises a straight motion assisting device according to claim 1 associated with the steering means for applying the restoring force for affecting the work machine toward the straight motion when the steering angle input indicates that the work machine deviates from the straight motion.

* * * * *